(12) United States Patent
Goto et al.

(10) Patent No.: US 6,755,763 B1
(45) Date of Patent: Jun. 29, 2004

(54) VEHICLE DRIVELINE SYSTEM WITH ELECTRONICALLY CONTROLLED ROLLER CLUTCH ASSEMBLY

(75) Inventors: Shiro Goto, Plymouth, MI (US); Koichi Okada, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/374,827

(22) Filed: Feb. 25, 2003

(51) Int. Cl.[7] .............................................. B60K 17/35
(52) U.S. Cl. ...................... 475/231; 475/237; 192/35; 192/44; 192/50
(58) Field of Search .............................. 192/43, 44, 35, 192/49, 50, 48.92, 84.8; 477/174, 70; 475/231, 237

(56) References Cited

U.S. PATENT DOCUMENTS

| | | | | |
|---|---|---|---|---|
| 1,321,618 A | * | 11/1919 | Fynn | |
| 1,599,389 A | * | 9/1926 | Aiken | |
| 1,890,973 A | * | 12/1932 | Drexler et al. | |
| 1,948,196 A | * | 2/1934 | Auperin | |
| 2,038,985 A | * | 4/1936 | Browne | |
| 2,049,798 A | * | 8/1936 | Booth et al. | |
| 2,181,700 A | * | 11/1939 | Leichsenring, Jr. | |
| 2,379,829 A | * | 7/1945 | Russell | |
| 3,324,744 A | * | 6/1967 | Roper | 475/87 |
| 3,388,779 A | * | 6/1968 | Roper | 192/44 |
| 3,430,519 A | * | 3/1969 | Roper | 475/87 |
| 3,448,636 A | * | 6/1969 | Roper et al. | |
| 3,517,573 A | * | 6/1970 | Roper | 475/232 |
| 4,799,395 A | * | 1/1989 | Janiszewski | |
| 4,867,291 A | * | 9/1989 | Holman et al. | |
| 4,955,853 A | * | 9/1990 | Bausch | 475/241 |
| 5,279,401 A | * | 1/1994 | Stall | |
| 5,286,239 A | * | 2/1994 | Ito et al. | |
| 5,366,041 A | * | 11/1994 | Shiraishi et al. | 180/248 |
| 5,366,421 A | * | 11/1994 | Hirota | |
| 5,474,164 A | * | 12/1995 | Berger | |
| 5,682,971 A | * | 11/1997 | Takakura et al. | |
| 5,776,288 A | * | 7/1998 | Stefanutti et al. | |
| 5,924,510 A | * | 7/1999 | Itoh et al. | |
| 5,927,456 A | * | 7/1999 | Monahan et al. | |

FOREIGN PATENT DOCUMENTS

JP        6-58378    *   3/1994

OTHER PUBLICATIONS

English Abstract of Japanese Patent No. 6–58378.*

* cited by examiner

Primary Examiner—Saul Rodriguez
(74) Attorney, Agent, or Firm—Brinks Hofer Gilson & Lione (57) ABSTRACT

A vehicle driveline assembly for an automotive vehicle includes a differential assembly adapted to transfer torque proportionally between first and second axle half-shafts. An over-running clutch is adapted to selectively lock the differential assembly thereby effectively rotationally locking the axle half shafts to one another. The differential has three modes of operation; an open mode, wherein the differential is kept un-locked; a locked mode, wherein the differential is kept locked; and an automatic mode, wherein the differential is locked or un-locked based upon predetermined operating parameters. A selector switch allows an operator to selectively place the differential in one of the three modes. An electronic control unit receives inputs from the vehicle, compares the inputs to pre-determined operating parameters, and selectively engages or disengages the over-running clutch when the differential is in the automatic mode.

35 Claims, 7 Drawing Sheets

VEHICLE DRIVELINE SYSTEM WITH ELECTRONICALLY CONTROLLED ROLLER CLUTCH ASSEMBLY

TECHNICAL FIELD OF THE INVENTION

This invention is related to a two way over-running clutch, preferably for use in automotive differential or transfer case applications. More specifically, the present invention relates to a two-way over-running clutch assembly of a roller/ramp variety which can be controlled for selectively locking up an automotive differential assembly or transfer case and a method of controlling the engagement of the over-running clutch.

BACKGROUND OF THE INVENTION

Differential assemblies are used in motor vehicles to allow the wheels to turn at different rotational speeds while still providing power to the wheels. Various types of differential assemblies are used in motor vehicles to redirect the transfer of power to the driving axles.

In a standard open differential, as a vehicle turns, power continues to be provided through pinion and ring gears to the differential housing. As the inner and outer wheels trace circles of different radii, side gears attached to axle shafts are allowed to turn at different speeds by the motion of intermediate spider gears. As long as traction is maintained between the drive wheels and the road surface, the power is properly distributed to the wheels through the differential assembly. However, when traction is reduced or lost altogether at one or both wheels, a standard open differential assembly will allow one wheel to spin uselessly, providing little tractive power to the wheels. For instance, if one tire is on ice or some other slippery surface while the other is on dry pavement, slip will occur at the low friction side and the torque applied to the non-slipping tire will be limited to the torque generated at the slipping tire. In such circumstances, very little power will be delivered to the wheel on the dry pavement and the vehicle will not be powered forward or backward. Therefore, there is a need to lock the axle halves together in certain situations causing both wheels to spin at about the same speed, irrespective of differing coefficients of friction encountered by the drive wheels.

It is known in the art to selectively lock other drivetrain components using roller/ramp clutch assemblies. For example, the two-way over-running clutch assembly described in U.S. Pat. No. 5,927,456, assigned to NTN Corporation, and hereby incorporated by reference, describes a clutch assembly of a roller ramp variety and the mechanism by which the rollers are retained and biased in the assembly. In addition, the rotation transmission device described in U.S. Pat. No. 5,924,510, also assigned to NTN Corporation, and hereby incorporated by reference, discloses a device which includes a clutch assembly mounted in the transfer case of a four-wheel drive vehicle that can selectively transmit a driving torque.

Typically, these types of over-running clutches must be either engaged or disengaged, requiring the operator of the vehicle to physically switch between the engaged and disengaged state. Therefore, there is a need for a driveline system utilizing an over-running clutch of the type describes above wherein the driveline system includes an electronic control unit adapted to collect vehicle operation data to determine if the over-running clutch should be engaged and to automatically switch the over-running clutch to engaged and disengaged as needed.

BRIEF SUMMARY OF THE INVENTION

In accordance with an aspect of the present invention an over-running clutch assembly comprises an outer race having a cylindrical inner surface and being rotatable about an axis and a case end enclosing a first end of the outer race, an inner race having a segmented (flat or slightly concave) outer surface coaxial with the cylindrical inner surface and defining a gap therebetween. The inner race is rotatable about the axis with rotational movement relative to the outer race. A plurality of ramp surfaces formed at spaced apart locations on the outer surface define a plurality of cammed surfaces on the outer surface of the inner race. A plurality of rollers are positioned between the outer race and the inner race with one of the rollers being located centrally within each of the cammed surfaces and each of the rollers having a diameter less than the gap between the center of the cammed surface on the inner race and the cylindrical inner surface of the outer race. A retainer interconnects all of the rollers and causes the rollers to circumferentially move in unison with one another. The retainer is rotatable about the axis with limited relative rotation with respect to the inner race. A first biasing element is supported on the retainer to radially bias the retainer position relative to the inner race such that each of the rollers is held in the center of the flat cammed surfaces on the inner race. An actuation disk is connected to the retainer by a means which allows some axial movement of the actuation disk with respect to the retainer toward the case end. The preferred method would include a series of retainer tabs extending axially from one end of the retainer and notches which are adapted to engage the retainer tabs, thereby preventing circumferential or relative rotational motion of the actuation disk relative to the retainer and allowing axial motion of the actuation disk relative to the retainer. There are at least two, and preferably four, tabs extending outward to engage notches within the actuation disk. A second biasing element is disposed between the actuation disk and the inner axial surface of the case end to bias the actuation disk away from the case end.

The clutch assembly includes an actuator to selectively overcome the second biasing element to force the actuation disk into contact with the case end, wherein rotation of the outer race and case end with respect to said inner race is frictionally transferred to the actuation disk and the retainer, overcoming the first biasing element, thereby moving the rollers along the ramp surfaces to a position where the rollers engage and wedge between the inner and outer races to prevent relative rotation between the inner and outer races.

Further, either the actuation disk, or the axial inner surface of the case end includes an undercut region which initially reduces the amount of surface area contact between the actuation disk and the axial inner surface of the case end. After initial contact has been made between the actuation disk and the case end, the actuation disk can deflect, thereby allowing the undercut portions between the actuation disk and the case end to contact as well. When the actuator is deactivated, The deflected portions of the actuation disk will be biased to spring back away from the case end, thereby allowing the second biasing element to bias the actuation disk away from the axial inner surface of the case end with less resistance due to surface tension.

DETAILED DESCRIPTION OF THE INVENTION

The following description of the preferred embodiment of the invention is not intended to limit the scope of the invention to this preferred embodiment, but rather to enable any person skilled in the art to make and use the invention.

Figure 1:
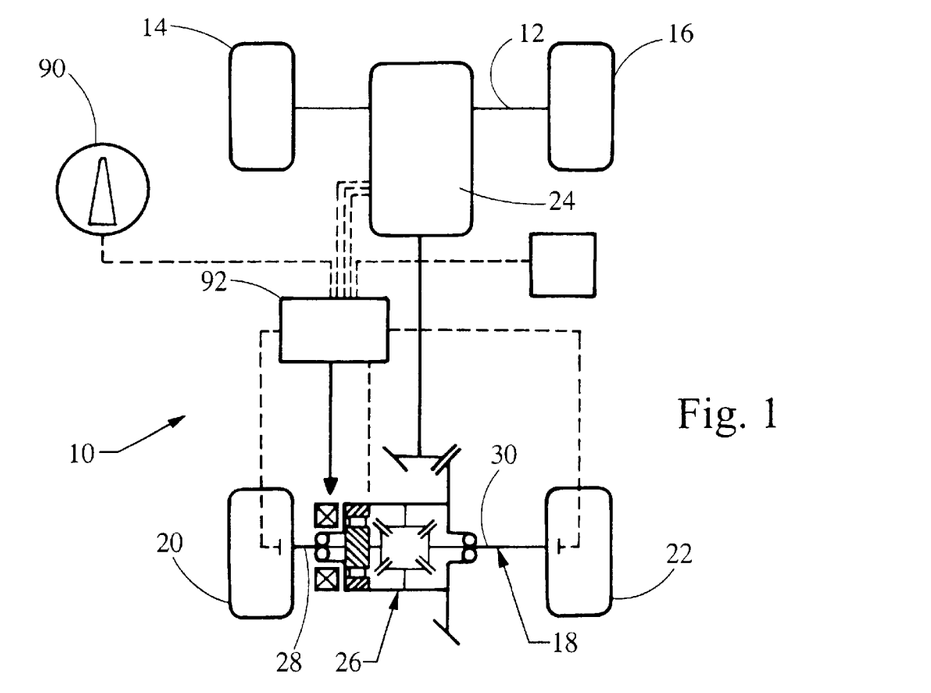
FIG. 1 is a schematic view of a driveline assembly of the present invention.

Referring to FIG. 1 a driveline assembly of the present invention is shown generally at 10. The driveline assembly 10 includes a front axle 12 supporting a left front wheel 14 and a right front wheel 16, and a rear axle 18 supporting a left rear wheel 20 and a right rear wheel 22. An engine 24 provides power to the rear axle 18 and a differential assembly 26 transfers torque from the engine 24 to a first axle half shaft 28 and a second axle half shaft 30. Each of the first and second axle half shafts 28, 30 are rotatable about a first axis 32.

Figure 2:
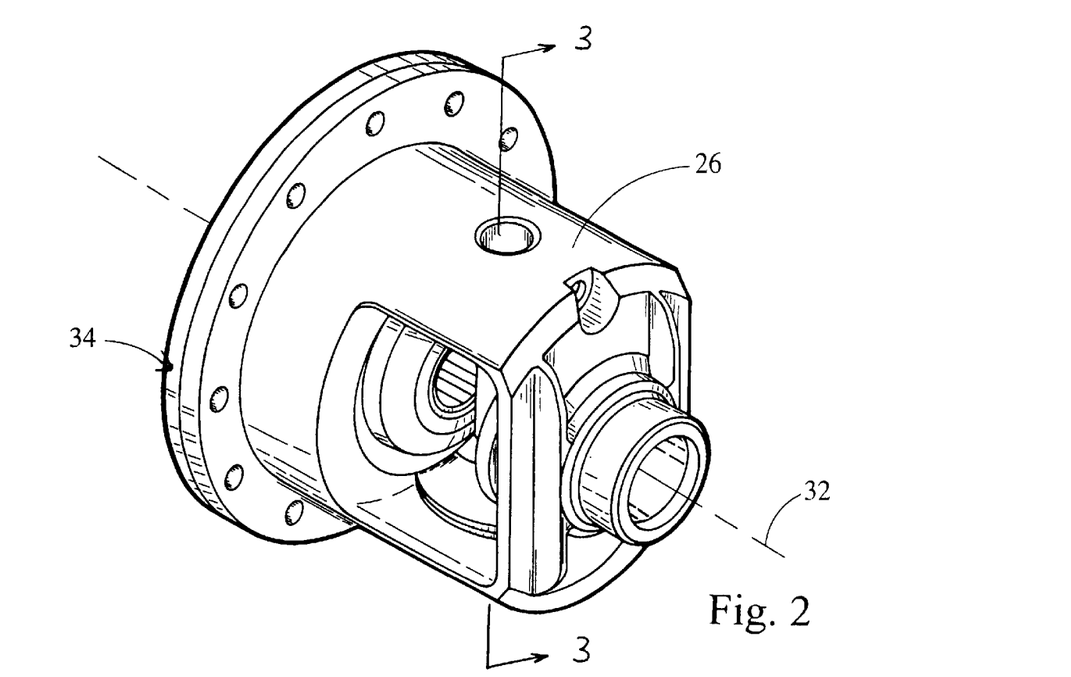
FIG. 2 is a perspective view of a differential assembly from the driveline assembly of FIG. 1.
Figure 3:
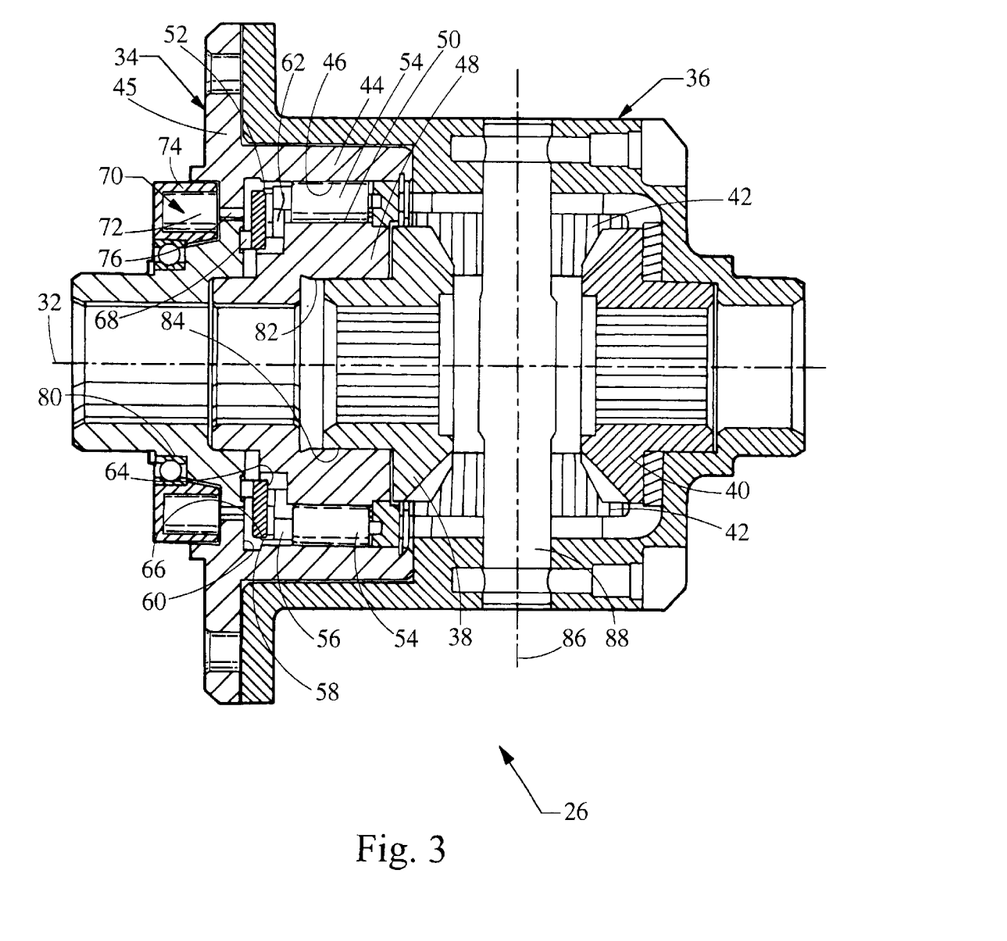
FIG. 3 is a sectional view taken along line 3—3 of FIG. 2.

Referring to FIGS. 2 and 3, the differential assembly 26 includes an over-running clutch 34. The over-running clutch 34 is adapted to selectively lock the differential assembly 26 thereby effectively rotationally locking the first and second axle half shafts 28, 30 to one another.

The differential assembly 26 includes a housing 36 with an input ring gear (not shown) mounted to an outer diameter thereof. Rotational motion from the drive train of the vehicle is transferred to the differential housing 36 through this ring gear. A first side gear 38 and a second side gear 40 are mounted within the differential housing 36 and are attached to the first and second axle half-shafts 28, 30 of the vehicle. Two or more spider gears 42 are mounted in the differential housing 36 so that they mesh with the first and second side gears 38, 40.

During normal straight line operation, the power provided is transmitted through the ring gear to the differential housing 36. Because there is no relative rotational speed difference between the two axle half shafts 28, 30 during normal straight line operation, the differential housing 36 and axle half shafts 28, 30 rotate at the same speed, and there is no relative motion between the side gears 38, 40 and the spider gears 42. When the vehicle turns, rotational speed differences between the two axle half shafts 28, 30 are caused by the differently sized circles being described by the tires 20, 22 on each side of the vehicle. As the axle half shafts 28, 30 turn at different speeds, the side gears 38, 40 also turn at different speeds, but the spider gears 42 keep the two axle half shafts 28, 30 meshed together and torque is split proportionally between the two sides.

The over-running clutch 34 is mounted within the differential housing 36 to allow both the axle half shafts 28, 30 of the vehicle to be locked together. The over-running clutch 34 includes an outer race 44 having an inner surface 46 that is rotatable about the first axis 32 and a case end 45. An inner race 48 includes a cammed outer surface 50 coaxial with the inner surface 46 of the outer race 44. The inner surface 46 of the outer race 44 and the outer surface 50 of the inner race 48 define a gap 52 between the inner race 48 and the outer race 44.

The outer race 44 is rotationally secured to the differential housing 36, and the inner race 48 is rotationally secured to the first side gear 38 and the first axle half shaft 28. A plurality of rolling elements 54 are positioned within the gap 52. Preferably, the rolling elements 54, the inner race 48 and the outer race 44 are made from steel. Due to the high hertzian contact stresses experienced by the rollers 54, the inner surface 46 of the outer race 44 and the outer surface 50 of the inner race 48, and the rolling elements 54 are preferably hardened and ground.

The cammed outer surface 50 of the inner race 48 is defined by a plurality of ramp surfaces that are formed at spaced apart locations along the outer surface 50. The rolling elements 54 are positioned between the outer race 44 and the inner race 48 with one rolling element 54 being located at the center of each of the ramp surfaces of the inner race 48. The rolling elements 54 have a diameter which is smaller than the gap 52 between the inner surface 46 and the midpoint of the cammed outer surface 50, but greater than the gap 52 between the outer portions of the ramp surfaces and the inner surface 46.

A retainer 56 interconnects all of the rolling elements 54 and causes the rolling elements 54 to circumferentially move in unison with one another. The retainer 56 is rotatable about the first axis 32 with limited relative rotation with respect to the inner race 48. The retainer 56 also includes a pair of retainer tabs 58 extending axially toward an inner surface 60 of the case end 45. A distal end of each of the retainer tabs 58 is located adjacent the inner surface 60 of the case end 45 at a distance from the case end 45.

A first biasing element 62 is mounted onto the retainer 56 to maintain the position of the retainer 56 with respect to the inner race 48 such that the rolling elements 54 are normally held in the middle of the ramp surfaces. An actuation disk 64 is disposed between the retainer 56 and the inner surface 60 of the case end 45. The actuation disk 64 has an outer diameter and an inner diameter. The actuation disk 64 further includes a pair of notches 66 located radially about the outer diameter or the inner diameter. The notches 66 are adapted to engage the retainer tabs 58 thereby preventing rotational motion of the actuation disk 64 relative to the retainer 56, while allowing axial motion of the actuation disk 64 relative to the retainer 56. It is to be understood, that the function of the notches 66 in the actuation disk 64 and the retainer tabs 58 is to rotationally link the actuation disk 64 to the retainer 56, and to allow axial movement of the actuation disk 64 relative to the retainer 56. This could be accomplished by incorporating notches within the retainer 56 and tabs on the actuation disk 64 or by other methods in addition to that presently described.

Referring again to FIG. 3, a second biasing element 68 is disposed between the actuation disk 64 and the inner surface 60 of the case end 45 to bias the actuation disk 64 away from the case end 45 and toward the retainer 56. Preferably, the second biasing element 68 is a wave spring.

Preferably, the first biasing element 62 is a centering spring supported by the inner race 48 and engaging the retainer 56 to keep the retainer 56 in position to keep the rolling elements 54 positioned at the center of the ramp surfaces of the inner race 48 thereby allowing the outer race 44 and the inner race 48 to rotate freely with respect to one another. The centering spring 62 includes a plurality of small tangs (not shown) extending radially in or out to engage small notches (not shown) on the retainer 56. The biasing force of the centering spring 62 must be carefully calibrated for the over-running clutch 34. The centering spring 62 must provide enough force to move the retainer 56 and rolling elements 54 to the neutral position easily when the over-running clutch 34 is dis-engaged, but not so much force that the friction between the actuation disk 64 and the case end 45 cannot overcome it to actuate the clutch 34.

The over-running clutch 34 includes an actuator 70 to selectively overcome the second biasing element 68 to force the actuation disk 64 into contact with the case end 45. The actuation disk 64 is free to move axially with respect to the retainer 56, so when the attractive force of the actuator 70 overcomes the force of the second biasing element 68, the actuation disk 64 will move axially toward the inner surface 60 of the case end 45 until the actuation disk 64 and the case end 45 come into contact with one another.

When the actuation disk 64 and the case end 45 are brought into contact with one another, the relative rotational motion of the outer race 44 and the case end 45 with respect to the actuation disk 64 will frictionally be transferred to the actuation disk 64. The actuation disk 64 is linked rotationally and circumferentially to the retainer tabs 58, therefore the rotational movement of the outer race 44 and the case end 45 will be transferred through the actuation disk 64 and to the retainer 56.

Rotational movement of the retainer 56 with respect to the inner race 48 moves the rolling elements 54 along the ramp surfaces until the rolling elements 54 are no longer positioned at the centers of the ramp surfaces. Since the gap 52 is not large enough to accommodate the diameter of the rolling elements 54, when the rolling elements 54 move out of the centers of the ramp surfaces, the rolling elements 54 become wedged between the outer surface 50 of the inner race 48 and the inner surface 46 of the outer race 44, thereby locking the inner race 48 and outer race 44 together rotationally. The ramp surfaces and the interaction of the ramp surfaces with the rolling elements 54 are described in detail in U. S. Pat. Nos. 5,927,456 and 5,924,510 which are both assigned to NTN Corporation and are hereby incorporated by reference into the present application.

Preferably, the actuator 58 comprises an electromagnetic coil 72 held within a housing 74 mounted to an interior surface of a stationary axle housing (not shown). The case end 45 includes a plurality of partially circumferential slots 76 extending through the case end 45 and spaced radially about the case end 45. When energized, the electromagnetic coil 72 produces a magnetic flux which is focused around the slots 76 and concentrated on the actuation disk 64. When the magnetic flux passes through the actuation disk 64, the actuation disk 64 is magnetically drawn toward the inner surface 60 of the case end 45. Once the magnetic force of the electromagnetic coil 72 overcomes the force of the second biasing element 68, the actuation disk 64 will start to move toward the inner surface 60 of the case end 45. It is to be understood, that the present invention could be practiced with an actuator 70 of some other type. The actuation disk 64 could be moved through hydraulic or pneumatic means as well as through electromagnetic means.

When the actuator 70 is de-energized, the magnetic attraction of the actuation disk 64 to the inner surface 60 of the case end 45 dissipates. As this attraction dissipates, the second biasing element 68 quickly overcomes the dissipating magnetic attraction and forces the actuation disk 64 back away from the inner surface 60 of the case end 45, thereby eliminating the frictional transfer of rotation to the actuation disk 64.

Without a rotational force to pull the retainer 56 and rolling elements 54 out of the neutral position, the first biasing element 62 will force the retainer 56 back into the neutral position and the rolling elements 54 back into the middle of the ramp surfaces, thereby allowing the outer race 44 to rotate freely with respect to the inner race 48, and un-locking the over-running clutch 34.

Preferably, the actuation disk 64 includes an annular step (not shown) extending around the inner diameter of the actuation disk 64. The annular step faces the inner surface 60 of the case end 45, and provides a recess into which the second biasing element 68 is piloted and can collapse into when the actuation disk 64 is drawn to the inner surface 60 of the case end 45. Preferably, the second biasing element 68 is a wave spring that fits within the annular step on the actuation disk 64 and collapses within the annular step when the force of the electromagnetic coil 72 exceeds the spring force of the second biasing element 68.

Preferably, the housing 74 for the electromagnetic coil 72 is mounted to the stationary axle carrier and is located with respect to the case end 45 by a bearing 80. The bearing 80 can be a ball, roller or journal bearing and will allow the electromagnetic coil 72 and the housing 74 to remain stationary with respect to the axle housing/carrier. This will allow wiring to the electromagnetic coil 72 to be simplified because an electrical connection to a rotating body is not required. Any means suitable to allow relative rotational movement between the housing 74 and the exterior surface of the case end 45 is adequate.

Within the differential assembly 26, the first side gear 38 is fixedly mounted to the inner race 48 of the over-running clutch 34. In the preferred embodiment, the inner race 48 includes a center bore 82 and the first side gear 38 includes an outer diameter 84, wherein the center bore 82 of the inner race 48 and the outer diameter 84 of the first side gear 38 are press fit or splined together. The inner race 48 and the first side gear 38 may also have splines formed on them to connect each to a common spline on the first axle half shaft 28, to prevent any relative rotational movement between the inner race 48 and the first side gear 38. In any instance, the first side gear 38 and the inner race 48 are locked together and functionally act as one component.

The spider gears 42 are mounted within the housing 36 and rotate about a second axis 86, that is perpendicular to the first axis 32, defined by a shaft 88 mounted therein. The first and second side gears 38, 40 are mounted within the differential housing 36 and rotate about the first axis 32. The spider gears 42 are mounted within the housing 36 and on the shaft 88 and are engaged with both the first and second side gears 38, 40.

When the over-running clutch 34 is disengaged, the inner race 48 and the outer race 44 are free to rotate relative to each other so the first side gear 38 and the first axle half shaft 28 are free to rotate relative to the differential housing 36. If the rotational speed of the axle half-shafts 28, 30 are different, such as when the vehicle turns, the side gears 38, 40 also turn at different speeds, but the spider gears 42 keep the two axles 28, 30 meshed together and torque is split proportionally between the two sides. In conditions of poor traction (wet roads, snow, ice), one wheel can slip and the differential assembly 26 doesn't allow the other wheel to carry any torque. Under these conditions, a vehicle can have trouble getting up even a low grade hill.

When the over-running clutch 34 is engaged, the first axle half-shaft 28, the first side gear 38, the inner race 48, the outer race 44 and the differential housing 36 are all locked together so that no relative rotation is allowed. When the first side gear 38 is locked rotationally to the differential housing 36, the spider gears 42, which are meshed with the first side gear 38 are prevented from rotating about the second axis 86, and the second side gear 40, which is meshed with the spider gears 42, is prevented from rotational movement relative to the differential housing 36. To simplify, when the over-running clutch 34 is engaged, the two side gears 38, 40 and consequently the two axle half-shafts 28, 30 are effectively locked together so that torque is transferred to both axle half-shafts 28, 30 equally and no relative rotation between the two axle half-shafts 28, 30 is allowed.

The driveline assembly 10 has three modes of operation. An open mode is where the over-running clutch 34 is disengaged, thereby leaving the differential assembly 26 unlocked and allowing relative rotation between the first and second axle half shafts 28, 30. A locked mode is where the over-running clutch 34 is engaged, thereby leaving the differential assembly 26 locked and preventing relative rotation between the first and second axle half shafts 28, 30. An automatic mode is where the over-running clutch 34 is defaulted to a disengaged position, and the over-running clutch 34 is selectively engaged when certain vehicle operating parameters are met.

A selector switch 90 is positioned within the vehicle to allow an operator of the vehicle to select one of the three modes for the differential assembly 26. When the selector switch 90 is in the automatic mode, an electronic control unit 92 collects vehicle operating data and determines when the over-running clutch 34 of the differential assembly 26 should be engaged and disengaged.

Figure 4:
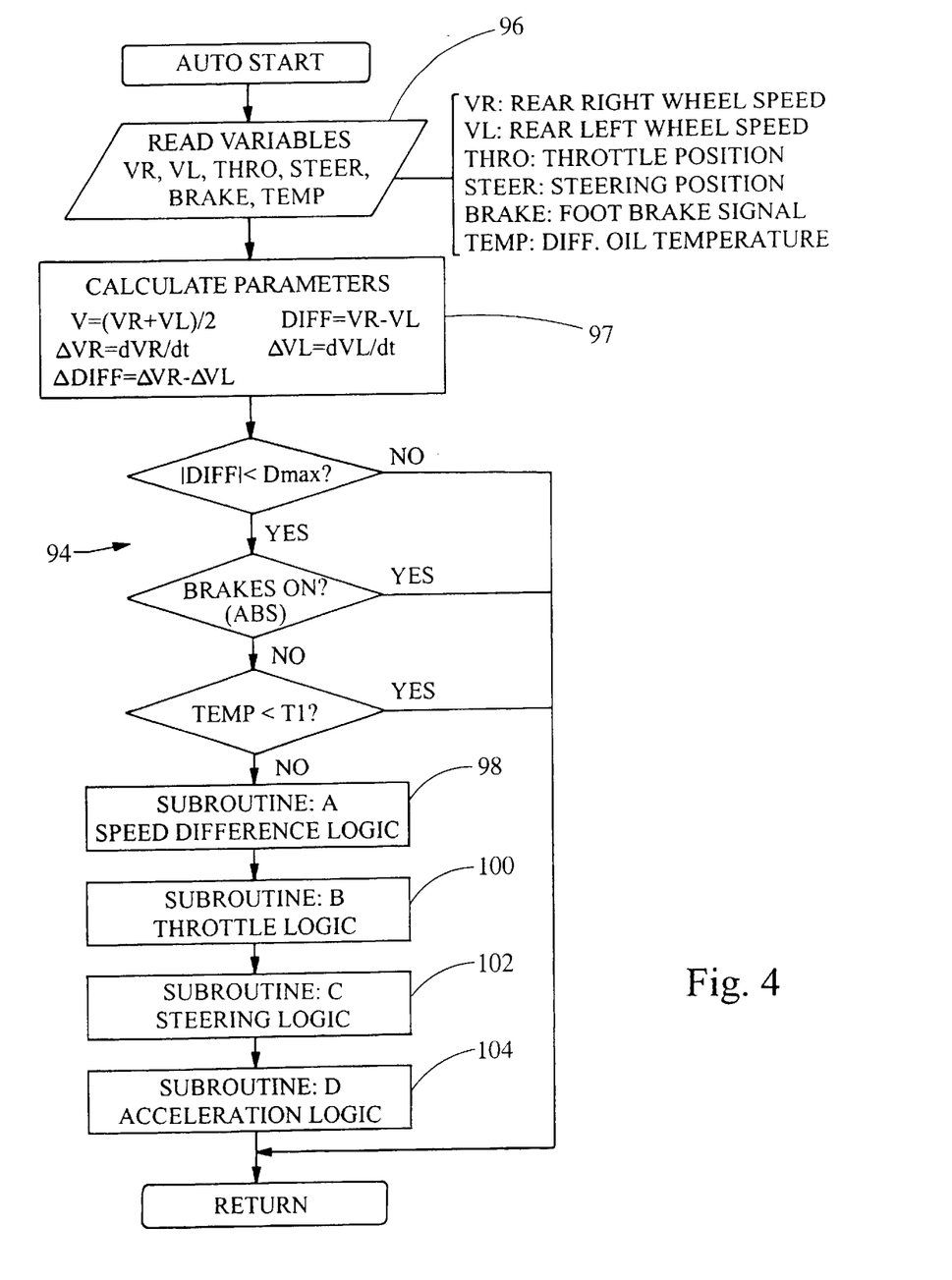
FIG. 4 is a flow chart illustrating a method of controlling the driveline assembly of FIG. 1.

First, the electronic control unit 92 determined the position of the selector switch 90. If the selector switch 90 is in the locked mode, the over-running clutch 34 is engaged. If the selector switch is in the open mode, or the automatic mode, the over-running clutch 34 is disengaged. If the selector switch 90 is in the automatic mode, then the electronic control unit 92 runs a control algorithm. Referring to FIG. 4, a flow chart of the control algorithm is shown generally at 94.

The electronic control unit begins the algorithm 94 by collecting data from the vehicle. The electronic control unit will collect the rotational speed of the right rear wheel 22 of the vehicle, the rotational speed of the left rear wheel 20 of the vehicle, a throttle position, a steering angle, engagement of a brake or ABS system, and the differential oil temperature, as shown in the block designated by reference numeral 96 in FIG. 4.

The rotational speed of the right and left rear wheels 20, 22 are measured as revolutions per minute, or RPM. The throttle position is measured as a percentage of throttle opening, wherein 0% represents no throttle opening and 100% represents full throttle opening. The steering angle is measured as the angle of the front wheels 14, 16 of the vehicle, wherein zero degrees represents the position of the front wheels 14, 16 when the vehicle is moving in a straight line forward. A steering angle of ten degrees describes a situation where the front wheels 14, 16 of the vehicle are turned to an angle that is ten degrees off center from the zero degree position either to the left or right of center. The engagement of the brake is simply whether the brakes of the vehicle are being engaged or not, or if the ABS system is operating. The system of the present invention can use either the engagement of the brakes or the operation of the ABS system as a variable. If the brake signal is positive, then either the brakes or the ABS system are being engaged, and if the brake signal is negative, then they are not. The differential oil temperature is the temperature of the oil within the differential assembly 26.

Next, the electronic control unit, ECU, 92 calculates an average wheel speed, V, that is the average speed of the two wheels 20, 22; a wheel speed differential, DIFF, that is the difference between the wheel speed of the right and left rear wheels 20, 22; an acceleration $\Delta VR$, $\Delta VL$, of each of the right and left rear wheels 20, 22; and an acceleration differential, $\Delta DIFF$, that is the difference between the acceleration of the right and left rear wheels 20, 22, as shown in block 97 of FIG. 4. Next, the ECU 92 compares the absolute value of the wheel speed differential, |DIFF|, to a predetermined maximum wheel speed differential, Dmax. The maximum allowed wheel speed differential, Dmax, depends upon the particular application, but is preferably on the magnitude of about 100–150 RPM. If the absolute value of the wheel speed differential, |DIFF|, exceeds the maximum wheel speed differential, Dmax, the ECU 92 does nothing and the over-running clutch 34 is left disengaged.

If the absolute value of the wheel speed differential, |DIFF|, is less than the maximum wheel speed differential, Dmax, then the ECU 92 checks for the brake signal to determine if the brakes of the vehicle are being applied, or alternatively, if the ABS system is operating. If the signal is positive, then the ECU 92 does nothing and the over-running clutch 34 is left disengaged.

If the brake signal is negative, then the ECU 92 compares the differential oil temperature, TEMP, to a predetermined oil temperature, T1. The predetermined oil temperature, T1, is determined based upon characteristics of the system and the particular application. Preferably, the predetermined oil temperature is approximately −30 degrees Celsius. If the temperature of the oil within the differential assembly 26 is less than the predetermined temperature, T1, then the ECU 92 does nothing and the over-running clutch 34 is left disengaged.

If the absolute value of the wheel speed differential, |DIFF|, is less than the maximum wheel speed differential, Dmax, the brake signal is negative, and the differential oil temperature, TEMP, is more than approximately −20 degrees Celsius, then the ECU 92 runs a speed difference subroutine 98 to determine if the overrunning clutch 34 should be engaged. If the speed difference subroutine 98 engages the over-running clutch 34, then the ECU 92 starts the control algorithm 94 over. If the speed difference subroutine 98 does not engage the over-running clutch 34, then the ECU 92 runs a throttle logic subroutine 100. If the throttle logic subroutine 100 engages the over-running clutch 34, then the ECU 92 starts the control algorithm 94 over. If the throttle logic subroutine 100 does not engage the over-running clutch 34, then the ECU 92 runs a steering logic subroutine 102. If the steering logic subroutine 102 engages the over-running clutch 34, then the ECU 92 starts the control algorithm 94 over. If the steering logic subroutine 102 does not engage the over-running clutch 34, then the ECU 92 runs an acceleration logic subroutine 104. Once the acceleration logic subroutine 104 has run the ECU 92 starts the control algorithm 94 over.

Figure 5:
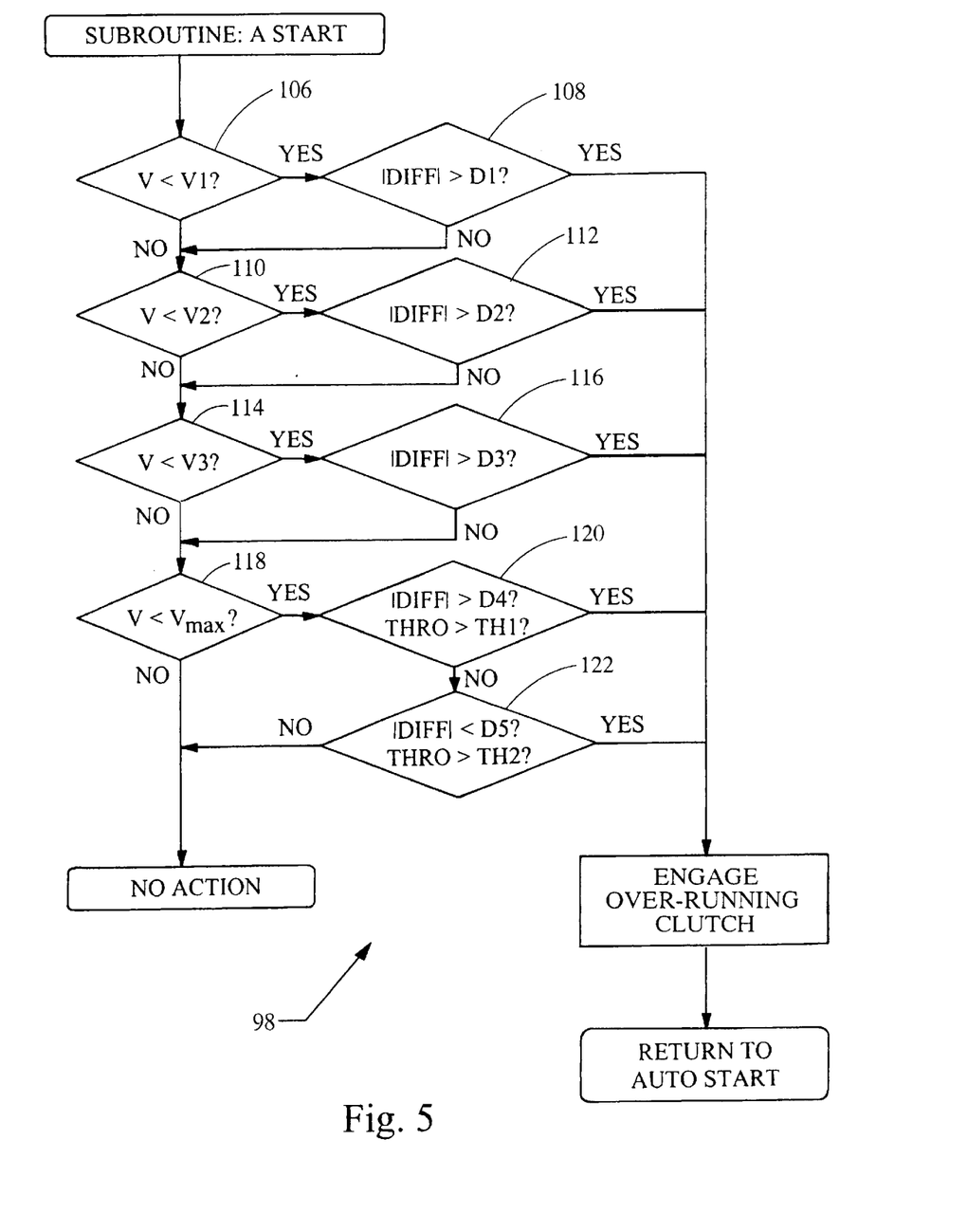
FIG. 5 is a flow chart illustrating the Speed Difference Subroutine shown in FIG. 4.

Referring to FIG. 5, a flow chart of the speed difference subroutine 98 is illustrated. First, the ECU 92 compares the average wheel speed, V, to a first predetermined average wheel speed, V1, as shown in block 106 of FIG. 5. Preferably, the first predetermined wheel speed, V1, is approximately three miles per hour (MPH). Thyen, the ECU 92 compares the absolute value of the wheel speed differential, |DIFF|, to a first predetermined wheel speed differential, D1, as shown in Block 108 of FIG. 5. Preferably, the first predetermined wheel speed differential is approximately ten revolutions per minute (RPM). If the average wheel speed, V, is less than approximately three MPH, and the absolute value of the wheel speed differential, |DIFF|, exceeds approximately ten RPM, then the over-running clutch 34 is engaged, and the control algorithm 94 starts over.

If the average wheel speed, V, is more than approximately three MPH, or if the absolute value of the wheel speed differential, |DIFF|, does not exceed approximately ten RPM, then the ECU 92 compares the average wheel speed, V, to a second predetermined average wheel speed, V2, as shown in block 110 of FIG. 5. Preferably, the second predetermined average wheel speed, V2, is approximately five MPH. This is to determine if the average wheel speed, V, falls between approximately three MPH and five MPH. Then, the ECU 92 compares the absolute value of the wheel speed differential, |DIFF|, to a second predetermined wheel speed differential, D2. Preferably, the second predetermined wheel speed differential, D2, is approximately twenty RPM.

If the average wheel speed, V, falls between approximately three MPH and five MPH, and if the absolute value of the wheel speed differential, |DIFF|, exceeds approximately twenty RPM, then the over-running clutch 34 is engaged.

If the average wheel speed, V, is more than approximately five MPH, or if the absolute value of the wheel speed differential, |DIFF|, does not exceed approximately twenty RPM, then the ECU 92 compares the average wheel speed, V, to a third predetermined average wheel speed, V3, as shown in block 114 of FIG. 5. Preferably, the third predetermined average wheel speed, V3, is approximately ten MPH. This is to determine if the average wheel speed is between approximately five MPH and ten MPH. Then the ECU 92 compares the absolute value of the wheel speed differential, |DIFF|, to a third predetermined wheel speed differential, D3, as shown in block 116 of FIG. 5. Preferably, the third predetermined wheel speed differential, D3, is approximately forty RPM.

If the average wheel speed, V, is between approximately five MPH and ten MPH, and if the absolute value of the wheel speed differential, |DIFF|, exceeds approximately forty RPM, then the over-running clutch 34 is engaged.

If the average wheel speed, V, is more than approximately ten MPH, or if the absolute value of the wheel speed differential, |DIFF|, does not exceed approximately forty RPM, then the ECU 92 compares the average wheel speed, V, to a maximum average wheel speed, Vmax, as shown in block 118. Preferably, the maximum average wheel speed, Vmax, is within the range of approximately 15–25 MPH, preferably twenty MPH. Then the ECU 92 compares the absolute value of the wheel speed differential, |DIFF|, to a fourth predetermined wheel speed differential, D4, and compares the throttle position, THRO, to a first predetermined throttle position, TH1, as shown in block 120 of FIG. 5. Preferably, the fourth predetermined wheel speed differential, D4, is approximately sixty RPM, the first predetermined throttle position is approximately 50%.

If the average wheel speed, V, is less than approximately twenty MPH, and if the absolute value of the wheel speed differential, |DIFF|, exceeds sixty RPM, and the throttle position, THRO, exceeds approximately 50%, then the over-running clutch 34 is engaged.

If the average wheel speed, V, is less than approximately 20 MPH, however, or if either the absolute value of the wheel speed differential, |DIFF|, does not exceed approximately sixty RPM, or the throttle position, THRO, does not exceed approximately 50%, then the ECU 92 compares the absolute value of the wheel speed differential, |DIFF|, to a fifth predetermined wheel speed differential, D5, and compares the throttle position, THRO, to a second predetermined throttle position, TH2, as shown in block 122 of FIG. 5. Preferably, the fifth predetermined wheel speed differential is approximately twenty RPM, and the second predetermined throttle position is approximately 25%.

If the absolute value of the wheel speed differential, |DIFF|, exceeds approximately twenty RPM, and if the throttle position, THRO, exceeds approximately 25%, then the over-running clutch 34 is engaged.

The speed difference subroutine 98 is adapted to control the engagement of the over-running clutch 34 to minimize noise, vibration, and harshness (NVH) issues. If at any time, the speed difference subroutine 98 engages the over-running clutch 34, then the ECU 92 will start the control algorithm 94 over. However, if the speed difference subroutine 98 does not engage the over-running clutch 34, then the ECU 92 runs a throttle logic subroutine 100.

Figure 6:
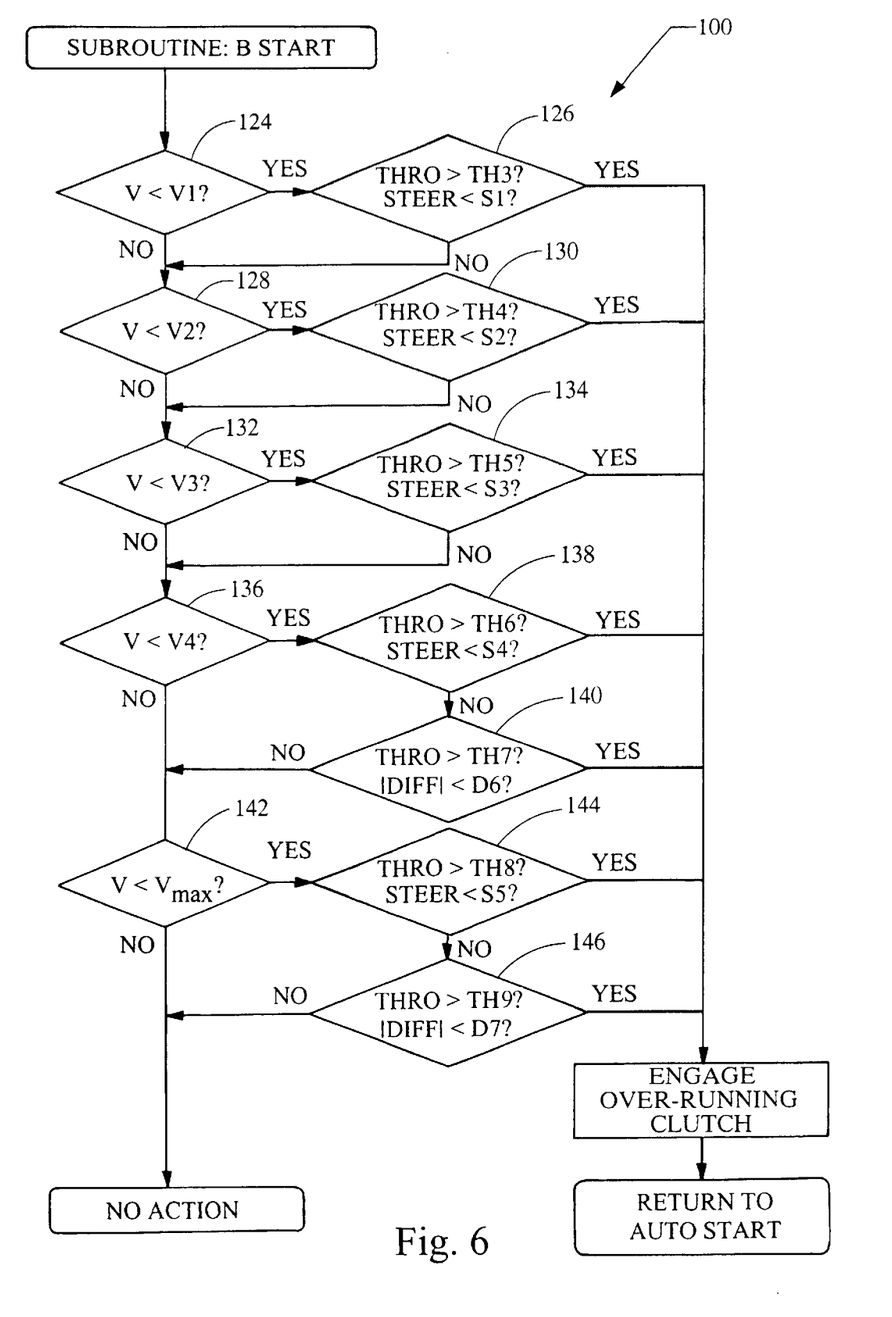
FIG. 6 is a flow chart illustrating the Throttle Subroutine shown in FIG. 4.

Referring to FIG. 6, a flow chart of the throttle logic subroutine 100 is illustrated. First, the ECU 92 compares the average wheel speed, V, to the first predetermined average wheel speed, V1, or approximately three MPH, as shown in Block 124 of FIG. 6. If the average wheel speed, V, exceeds approximately three MPH, then the ECU 92 compares the throttle position, THRO, to a third predetermined throttle position, TH3, and compares the steering angle, STEER, to a first predetermined steering angle, S1, as shown in block 126 of FIG. 6. Preferably, the third predetermined throttle position, TH3 is approximately 10%, and the first predetermined steering angle, S1, is approximately thirty degrees.

If the average wheel speed, V, is less than approximately three MPH, and if the throttle position, THRO, exceeds approximately 10%, and if the steering angle, STEER, is less than approximately thirty degrees, then the over-running clutch 34 is engaged.

If the average wheel speed, V, exceeds three MPH, or if the throttle position, THRO, is less than approximately 10%, or if the steering angle, STEER, exceeds approximately thirty degrees, then the ECU 92 compares the average wheel speed, V, to the second predetermined average wheel speed, V2, or approximately five MPH, as shown in Block 128 of FIG. 6. If the average wheel speed exceeds approximately five MPH, then the ECU 92, compares the throttle position, THRO, to a fourth predetermined throttle position, TH4, and compares the steering angle, STEER, to a second predetermined steering angle, S2, as shown in block 130 of FIG. 6. Preferably, the fourth predetermined throttle position is approximately 20%, and the second predetermined steering angle is approximately twenty degrees.

If the average wheel speed, V, is less than approximately five MPH, and if the throttle position, THRO, exceeds approximately 20%, and if the steering angle, STEER, is less than approximately twenty degrees, then the over-running clutch 34 is engaged.

If the average wheel speed, V, exceeds approximately five MPH, or if the throttle position, THRO, is less than approximately 20%, or if the steering angle, STEER, exceeds approximately twenty degrees, then the ECU 92 compares the average wheel speed, V, to the third predetermined average wheel speed, V3, or approximately ten MPH, as shown in Block 132 of FIG. 6. If the average wheel speed exceeds approximately ten MPH, then the ECU 92 compares the throttle position, THRO, to a fifth predetermined throttle position, TH5, and compares the steering angle, STEER, to a third predetermined steering angle, S3, as shown in block 134 of FIG. 6. Preferably, the fifth predetermined throttle position, TH5, is approximately 30%, and the third predetermined steering angle, S3, is approximately ten degrees.

If the average wheel speed, V, is less than approximately ten MPH, and if the throttle position, THRO, exceeds approximately 30%, and if the steering angle, STEER, is less than approximately ten degrees, then the over-running clutch 34 is engaged.

If the average wheel speed, V, exceeds approximately ten MPH, or if the throttle position, THRO, is less than approximately 30%, or if the steering angle, STEER, exceeds approximately ten degrees, then the ECU 92 compares the average wheel speed, V, to a fourth predetermined average wheel speed, V4, or approximately fifteen MPH, as shown in Block 136 of FIG. 6. If the average wheel speed exceeds approximately fifteen MPH, then the ECU 92 compares the throttle position, THRO, to a sixth predetermined throttle position, TH6, and compares the steering angle, STEER, to a fourth predetermined steering angle, S4, as shown in block 138 of FIG. 6. Preferably, the sixth predetermined throttle position, TH6, is approximately 10%, and the fourth predetermined steering angle, S4, is approximately ten degrees.

If the average wheel speed, V, is less than approximately fifteen MPH, and if the throttle position, THRO, exceeds approximately 10%, and if the steering angle, STEER, is less than approximately ten degrees, then the over-running clutch 34 is engaged.

If the average wheel speed, V, is less than approximately fifteen MPH, however, either the throttle position, THRO, is less than approximately 10%, or the steering angle, STEER, exceeds approximately ten degrees, then the ECU 92 compares the throttle position, THRO, to a seventh predetermined throttle position, TH7, and compares the absolute value of the wheel speed differential, |DIFF|, to a sixth predetermined wheel speed differential, D6, as shown in block 140 of FIG. 6. Preferably, the seventh predetermined throttle position, TH7, is approximately 60%, and the sixth predetermined wheel speed differential, D6, is approximately five RPM.

If the throttle position, THRO, exceeds approximately 60%, and if the absolute value of the wheel speed differential, |DIFF|, is less than approximately five RPM, then the over-running clutch 34 is engaged.

If the average wheel speed, V, exceeds approximately fifteen MPH, or if the throttle position, THRO, is less than approximately 60%, or if the absolute value of the wheel speed differential, |DIFF|, exceeds approximately five RPM, then the ECU 92 compares the average wheel speed, V, to the maximum average wheel speed, Vmax, or approximately twenty MPH, as shown in Block 142 of FIG. 6. If the average wheel speed exceeds approximately twenty MPH, then the ECU 92 compares the throttle position, THRO, to an eighth predetermined throttle position, TH8, and compares the steering angle, STEER, to a fifth predetermined steering angle, S5, as shown in block 144 of FIG. 6. Preferably, the eighth predetermined throttle position, TH8, is approximately 20%, and the fifth predetermined steering angle, S5, is approximately ten degrees.

If the average wheel speed, V, is less than approximately twenty MPH, and if the throttle position, THRO, exceeds approximately 20%, and if the steering angle, STEER, is less than approximately ten degrees, then the over-running clutch 34 is engaged.

If the average wheel speed, V, is less than approximately twenty MPH, however, either the throttle position, THRO, is less than approximately 20%, or the steering angle, STEER, exceeds approximately ten degrees, then the ECU 92 compares the throttle position, THRO, to a ninth predetermined throttle position, TH9, and compares the absolute value of the wheel speed differential, |DIFF|, to a seventh predetermined wheel speed differential, D7, as shown in block 146 of FIG. 6. Preferably, the ninth predetermined throttle position, TH9, is approximately 70%, and the seventh predetermined wheel speed differential, D7, is approximately five RPM.

If the throttle position, THRO, exceeds approximately 70%, and if the absolute value of the wheel speed differential, |DIFF|, is less than approximately five RPM, then the over-running clutch 34 is engaged.

The throttle logic subroutine 100 is adapted to control the engagement of the over-running clutch 34 during tight maneuvering, such as in a parking lot. At lower speeds, the vehicle must be traveling in almost a straight line for the over-running clutch 34 to be engaged. At slightly higher speeds, the over-running clutch 34 is allowed to engage at slightly higher steering angles because at higher speeds, there is less likelihood that the vehicle is in a tight maneuvering situation. If at any time, the throttle logic subroutine 100 engages the over-running clutch 34, then the ECU 92 will start the control algorithm 94 over. However, if the throttle logic subroutine 100 does not engage the over-running clutch 34, then the ECU 92 runs a steering logic subroutine 102.

Figure 7:
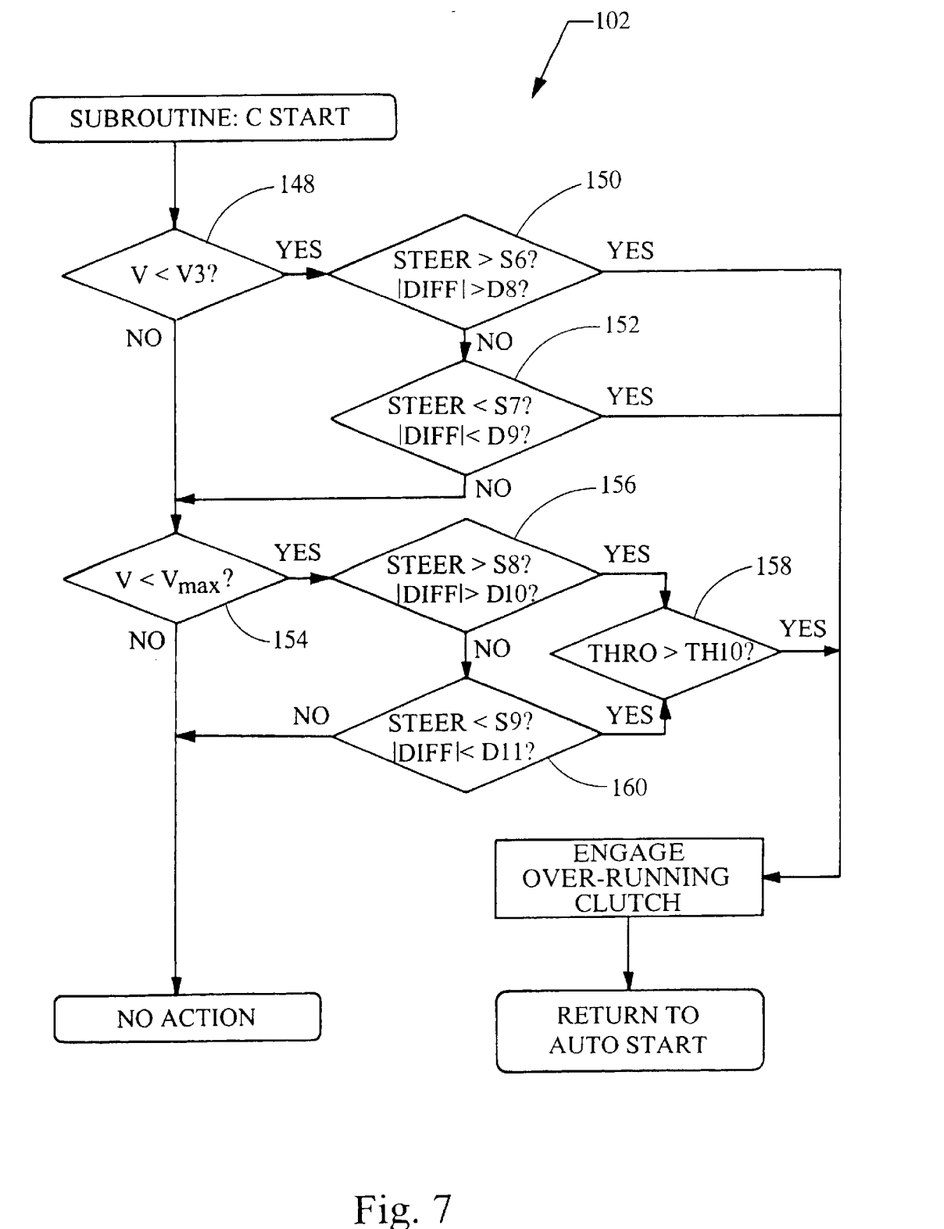
FIG. 7 is a flow chart illustrating the Steering Subroutine shown in FIG. 4.

Referring to FIG. 7, a flow chart of the steering logic subroutine 102 is illustrated. First, the ECU 92 compares the average wheel speed, V, to the third predetermined average wheel speed, V3, or approximately ten MPH, compares the steering angle, STEER, to a sixth predetermined steering angle, S6, and compares the absolute value of the wheel speed differential, |DIFF|, to an eighth predetermined wheel speed differential, D8, as shown in blocks 148 and 150 of FIG. 7. Preferably, the sixth predetermined steering angle, S6, is approximately forty-five degrees, and the eighth predetermined wheel speed differential, D8, is approximately fifty RPM.

If the average wheel speed, V, is less than approximately ten MPH, and if the steering angle, STEER, exceeds approximately forty-five degrees, and if the absolute value of the wheel speed differential, |DIFF|, exceeds approximately fifty RPM, then the over-running clutch 34 is engaged.

If the average wheel speed, V, is less than approximately ten MPH, however, either the steering angle, STEER, is less than approximately forty-five degrees, or if the absolute value of the wheel speed differential, |DIFF|, is less than approximately fifty RPM, then the ECU compares the steering angle, STEER, to a seventh predetermined steering angle, S7, and compares the absolute value of the wheel speed differential, |DIFF|, to a ninth predetermined wheel speed differential, D9, as shown in block 152 of FIG. 7. Preferably the seventh predetermined steering angle, S7, is approximately ten degrees, and the ninth predetermined wheel speed differential, D9, is approximately twenty RPM.

If the steering angle, STEER, is less than approximately ten degrees, and if the absolute value of the wheel speed differential, |DIFF|, is less than approximately twenty RPM, then the over-running clutch 34 is engaged.

If the steering angle, STEER, exceeds approximately ten degrees, or if the absolute value of the wheel speed differential, |DIFF|, exceeds approximately twenty RPM, then the ECU compares the average wheel speed, V, to the maximum average wheel speed, Vmax, or approximately twenty MPH, compares the steering angle, STEER, to an eighth predetermined steering angle, S8, compares the absolute value of the wheel speed differential, |DIFF|, to a tenth predetermined wheel speed differential, D10, and compares the throttle position, THRO, to a tenth predetermined throttle position, TH10, as shown in blocks 154, 156, and 158 of FIG. 7. Preferably, the eighth predetermined steering angle, S8, is approximately twenty degrees, the tenth predetermined wheel speed differential, D10, is approximately forty RPM, and the tenth predetermined throttle position, TH10, is approximately 10%.

If the average wheel speed, V, is less than approximately twenty MPH, and if the steering angle, STEER, exceeds approximately twenty degrees, if the absolute value of the wheel speed differential, |DIFF|, exceeds approximately forty RPM, and if the throttle position, THRO, exceeds approximately 10%, then the overrunning clutch 34 is engaged.

If the average wheel speed, V, is less than approximately twenty MPH, however, either the steering angle, STEER, is less than approximately twenty degrees, of if the absolute value of the wheel speed differential, |DIFF|, is less than approximately forty RPM, then the ECU compares the steering angle, STEER, to a ninth predetermined steering angle, S9, compares the absolute value of the wheel speed differential, |DIFF|, to an eleventh predetermined wheel speed differential, D11, and compares the throttle position, THRO, to the tenth predetermined throttle position, TH10, or approximately 10%, as shown in blocks 158 and 160 of FIG. 7. Preferably, the ninth predetermined steering angle, S9, is approximately five degrees, and the eleventh predetermined wheel speed differential, D11, is approximately ten RPM.

If the steering angle, STEER, is less than approximately five degrees, if the absolute value of the wheel speed differential, |DIFF|, is less than approximately ten RPM, and if the throttle position exceeds approximately 10%, then the over-running clutch 34 is engaged.

The steering logic subroutine 102 is adapted to engage the over-running clutch 34 when the vehicle is in a tight maneuvering situation, but only when there is a lot of slippage of the wheels. This situation occurs when the vehicle is maneuvering on loose terrain such as mud and gravel or other off-road situations. Because of the high amount of slippage, the over-running clutch 34 is allowed to engage at higher steering angels. If at any time, the steering logic subroutine 102 engages the over-running clutch 34, then the ECU 92 will start the control algorithm 94 over. However, if the steering logic subroutine 102 does not engage the overrunning clutch 34, then the ECU 92 runs an acceleration logic subroutine 104.

Figure 8:
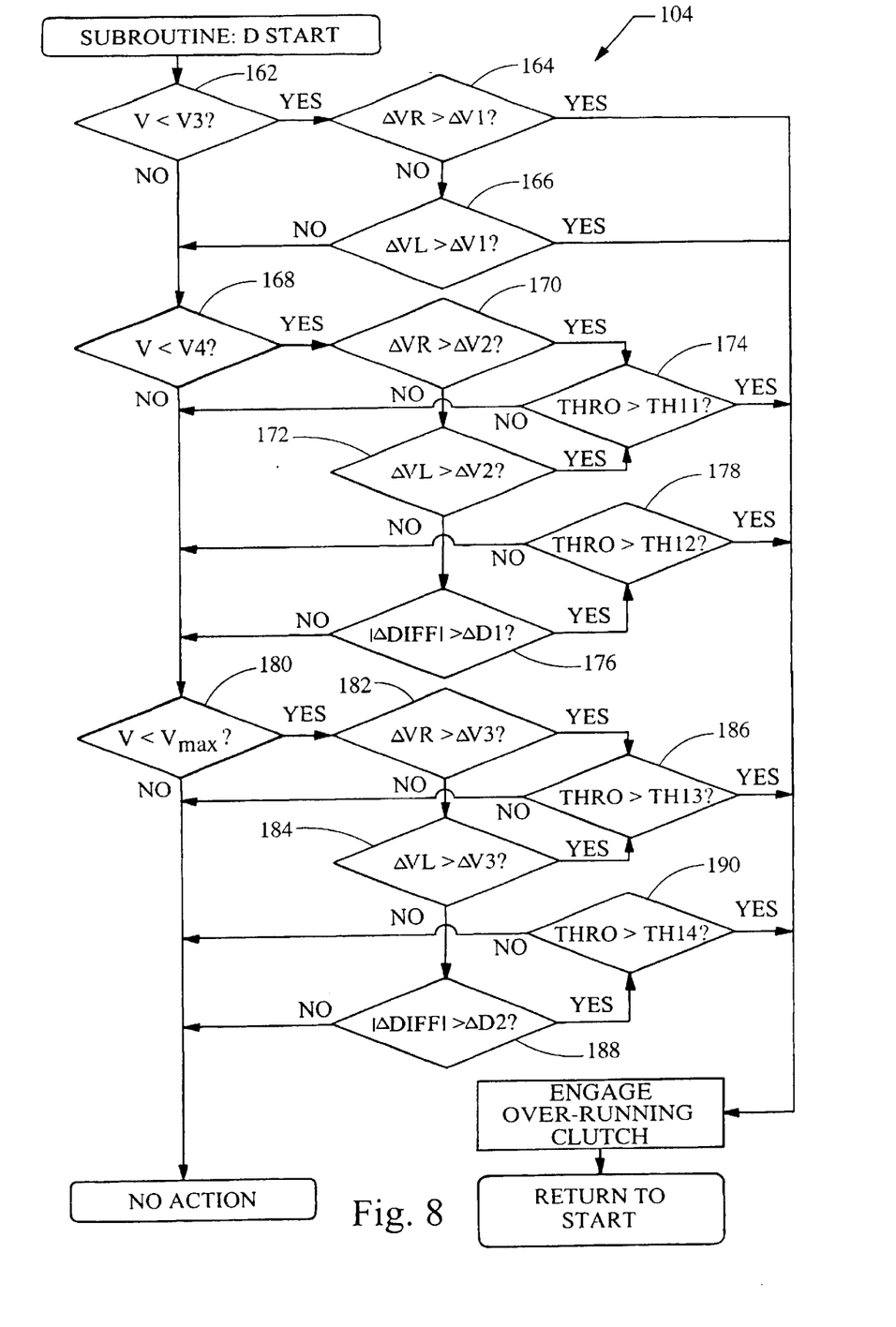
FIG. 8 is a flow chart illustrating the Acceleration Subroutine shown in FIG. 4.

Referring to FIG. 8, a flow chart of the acceleration logic subroutine 104 is illustrated. First, the ECU 92 compares the average wheel speed, V, to the third predetermined average wheel speed, V3, or approximately ten MPH, and compares the acceleration of each of the right and left wheels, ΔVR and ΔVL, to a first predetermined acceleration, ΔV1, as shown in blocks 162, 164, and 166 of FIG. 8. Preferably the first predetermined acceleration, ΔV1, is approximately thirty MPH per second, or thirty MPH/s.

If the average wheel speed, V, is less than approximately ten MPH, and if the acceleration of either of the right or left rear wheels, ΔVR and ΔVL, exceeds approximately thirty MPH/s, then the over-running clutch 34 is engaged.

If the average wheel speed, V, exceeds approximately ten MPH, or if neither of the acceleration of the right or left rear wheels, ΔVR and ΔVL, exceeds approximately thirty MPH/s, then the ECU compares the average wheel speed, V, to the fourth predetermined average wheel speed, V4, or approximately fifteen MPH, compares the acceleration of each of the right and left wheels, ΔVR and ΔVL, to a second predetermined acceleration, ΔV2, and compares the throttle position, THRO, to an eleventh predetermined throttle position, TH11, as shown in blocks 168, 170, 172, and 174 of FIG. 8. Preferably, the second predetermined acceleration, ΔV2, is approximately twenty MPH/s, and the eleventh predetermined throttle position, TH11, is approximately 15%.

If the average wheel speed, V, is less than approximately fifteen MPH, if the acceleration of either of the right or left rear wheels, ΔVR and ΔVL, exceeds approximately twenty MPH/s, and the throttle position, THRO, exceeds approximately 15%, then the over-running clutch 34 is engaged.

If the average wheel speed, V, is less than approximately fifteen MPH, however, the acceleration of neither of the right or left rear wheels, ΔVR and ΔVL, exceeds approximately twenty MPH/s, or if the throttle position, THRO, does not exceed approximately 15%, then the ECU compares the absolute value of the acceleration differential, |ΔDIFF|, to a first predetermined acceleration differential, ΔD1, and compares the throttle position, THRO, to a twelfth predetermined throttle position, TH12, as shown in blocks 176 and 178 of FIG. 8. Preferably, the first predetermined acceleration differential, ΔD1, is approximately three-hundred and fifty RPM per second, or three-hundred and fifty RPM/s, and the twelfth predetermined throttle position, TH12, is approximately 15%.

If the absolute value of the acceleration differential, |ΔDIFF|, exceeds approximately three-hundred and fifty RPM/s, and the throttle position, THRO, exceeds approximately 15%, then the over-running clutch 34 is engaged.

If the absolute value of the acceleration differential, |ΔDIFF|, does not exceed approximately three-hundred and fifty RPM/s, or if the throttle position, THRO, does not exceed approximately 15%, then the ECU compares the average wheel speed, V, to the maximum average wheel speed, Vmax, or approximately twenty MPH, compares the acceleration of each of the right and left wheels, ΔVR and ΔVL, to a third predetermined acceleration, ΔV3, and compares the throttle position, THRO, to a thirteenth predetermined throttle position, TH13, as shown in blocks 180, 182, 184, and 186 of FIG. 8. Preferably, the third predetermined acceleration, ΔV3, is approximately fifteen MPH/s, and the thirteenth predetermined throttle position, TH13, is approximately 20%.

If the average wheel speed, V, is less than approximately twenty MPH, if the acceleration of either of the right or left rear wheels, ΔVR and ΔVL, exceeds approximately fifteen MPH/s, and if the throttle position, THRO, exceeds approximately 20%, then the over-running clutch 34 is engaged.

If the average wheel speed, V, is less than approximately twenty MPH, however, the acceleration of neither of the right or left rear wheels, ΔVR and ΔVL, exceeds approximately fifteen MPH/s, or the throttle position does not exceed approximately 20%, then the ECU compares the absolute value of the acceleration differential, |ΔDIFF|, to a second predetermined acceleration differential, ΔD2, and compares the throttle position, THRO, to a fourteenth predetermined throttle position, TH14, as shown in blocks 188 and 190 of FIG. 8. Preferably, the second predetermined acceleration differential, ΔD2, is approximately two-hundred and fifty RPM/s, and the fourteenth predetermined throttle position, TH14, is approximately 20%.

If the absolute value of the acceleration differential, |ΔDIFF|, exceeds approximately two-hundred and fifty RPM/s, and the throttle position, THRO, exceeds approximately 20%, then the over-running clutch 34 is engaged.

The acceleration subroutine 104 is adapted to detect when one tire is just starting to slip, and to engage the over-running clutch to keep the wheels locked, thereby preventing slippage. If at any time, the acceleration logic subroutine 104 engages the over-running clutch 34, then the ECU 92 will start the control algorithm 94 over. If the acceleration logic subroutine 104 does not engage the over-running clutch 34, then the ECU 92 will start the control algorithm 94 over.

The foregoing discussion discloses and describes the preferred embodiments of the invention. One skilled in the art will readily recognize from such discussion, and from the accompanying drawings and claims, that changes and modifications can be made to the invention without departing from the fair scope of the invention as defined in the following claims. The invention has been described in an illustrative manner, and it is to be understood that the terminology which has been used is intended to be in the nature of words of description rather than of limitation.

What is claimed is:

1. A vehicle driveline assembly for an automotive vehicle comprising:

a rear axle having a first axle half shaft and a second axle half shaft, each rotatable about a first axis;

a differential assembly positioned between said first and second axle half-shafts, said differential assembly adapted to transfer torque to said first and second axle half shafts;

an over-running clutch adapted to selectively lock said differential assembly thereby effectively rotationally locking said axle half shafts to one another, said differential having three modes of operation, an open mode, wherein the differential is kept un-locked, and relative rotation is allowed between said axle half shafts, a locked mode, wherein said differential is kept locked, thereby preventing relative rotation between said axle half shafts, and an automatic mode, wherein said differential is locked or un-locked based upon predetermined operating parameters;

a selector switch adapted to allow an operator of the vehicle to selectively place said differential in one of said three modes of operation;

an electronic control unit adapted to receive inputs from the vehicle and to compare the inputs to pre-determined operating parameters and to selectively engage or disengage said over-running clutch based upon the inputs.

2. The driveline assembly of claim 1 wherein said differential assembly includes a differential housing, a least two spider gears rotatable about a second axis and mounted to said differential housing for rotation therewith, a first side gear being fixedly coupled to said first axle half-shaft, and a second side gear being fixedly coupled to said second axle half-shaft.

3. The driveline assembly of claim 2, wherein said second axis is established by a shaft mounted within said housing, said spider gears being rotatably mounted to said shaft.

4. The driveline assembly of claim 3 wherein said over-running clutch is coupled to said differential housing and said first axle half shaft and includes:

an outer race having a cylindrical inner surface and a case end enclosing one end of said outer race, said outer race being rotatable about said first axis;

an inner race having an outer surface coaxial with said cylindrical inner surface and defining a gap between said outer surface and said cylindrical inner surface, said inner race being rotatable about said first axis with allowable rotational movement relative to said outer race;

a plurality of ramp surfaces formed at spaced apart locations about said outer surface of said inner race, said ramp surfaces defining a plurality of cammed surfaces on said outer surface of said inner race;

a plurality of rolling elements positioned between said outer race and said inner race, said rolling elements having a diameter less than said gap between said cylindrical inner surface and the midpoint of said cammed surfaces;

a retainer interconnecting all of said rolling elements and causing said rolling elements to circumferentially move in unison with one another, said retainer being rotatable about said first axis with limited relative rotation with respect to said inner race, said retainer including a plurality of retainer tabs extending axially toward an axial inner surface of said case end, a distal end of each of said retainer tabs being adjacent and spaced from said inner surface of said case end;

a first biasing element supported on said inner race to radially bias said retainer so as to hold each of said rolling elements onto the midpoints of said cammed surfaces, when said clutch is not engaged;

an actuation disk having an outer diameter, an inner diameter and a thickness, disposed between said retainer and said inner surface of said case end, said actuation disk further including a plurality of notches located radially about one of said inner diameter and said outer diameter, said notches adapted to engage said retainer tabs thereby preventing rotational motion of said actuation disk relative to said retainer and allowing axial motion of said actuation disk relative to said retainer;

a second biasing element disposed between said actuation disk and said inner surface of said case end to bias said actuation disk away from said case end and toward said retainer; and an actuator to selectively overcome said second biasing element to force said actuation disk into contact with said case end, wherein rotation of said outer race and said case end with respect to said inner race is frictionally transferred to said actuation disk and said retainer, thereby overcoming said first biasing element and moving said rollers along said ramp surfaces to a position where said rollers engage and wedge between said inner and outer races to prevent relative rotation between said inner and outer races, thereby locking both of said axle half-shafts together rotationally and transferring torque through said differential housing to both of said axles half-shafts evenly.

5. The driveline assembly of claim 4, wherein said first side gear is fixedly connected to said inner race, thereby fixedly connecting said first axle half-shaft to said inner race, and said second side gear is rotatably supported by said differential housing, thereby rotatably supporting said second axle half-shaft with said differential housing.

6. The driveline assembly of claim 5, wherein said actuator comprises an electromagnetic coil held within a housing mounted to an interior surface of an axle housing and is located with respect to said case end by a bearing to allow said case end and said outer race to rotate independently of said housing, said case end including slots spaced radially thereabout, wherein a magnetic flux is focused around said slots to said actuation disk when said electromagnetic coil is energized, thereby magnetically attracting said actuation disk toward said inner surface of said case end.

7. The driveline assembly of claim 6 wherein said first biasing element is a centering spring held in place between said inner race and said retainer to bias said retainer into a neutral position wherein the rolling elements are held at the midpoints of said cammed surfaces, when said clutch is not engaged.

8. The driveline assembly of claim 7 wherein said actuation disk further includes a recess formed on an axial face of said actuation disk and said second biasing element is a wave spring resting within said recess, said recess providing a cavity into which said wave spring compresses when said actuation disk is forced into contact with said inner surface of said case end.

9. A method of controlling a vehicle driveline assembly for an automotive vehicle having a rear axle with a first axle half shaft and a second axle half shaft, each rotatable about a first axis, a differential assembly positioned between the first and second axle half-shafts that is adapted to transfer torque to the first and second axle half shafts, an over-running clutch adapted to selectively lock the differential assembly thereby effectively rotationally locking the first and second axle half shafts to one another, the differential assembly having three modes of operation, an open mode, wherein the over-running clutch is disengaged, and relative rotation is allowed between the axle half shafts, a locked mode, wherein the over-running clutch is engaged, thereby preventing relative rotation between the axle half shafts, and an automatic mode, wherein the over-running clutch is engaged or disengaged based upon predetermined operating parameters, a selector switch that is adapted to allow an operator of the vehicle to selectively place the differential assembly in one of the three modes of operation, and an electronic control unit that is adapted to receive inputs from the vehicle and to compare the inputs to the pre-determined operating parameters and to selectively engage or disengage the over-running clutch based upon the inputs, the method including:

determining if the selector switch is in the open mode, the locked mode, or the automatic mode; and engaging the over-running clutch when the selector switch is in the locked mode, and disengaging the over-running clutch when the selector switch is in the open or automatic mode.

10. The method of claim 9 wherein the over-running clutch is coupled to the differential housing and the first axle half shaft and includes:

an outer race having a cylindrical inner surface and a case end enclosing one end of the outer race, the outer race being rotatable about the first axis;

an inner race having an outer surface coaxial with the cylindrical inner surface and defining a gap between the outer surface and the cylindrical inner surface, the inner race being rotatable about the first axis with allowable rotational movement relative to the outer race;

a plurality of ramp surfaces formed at spaced apart locations about the outer surface of the inner race, the ramp surfaces defining a plurality of cammed surfaces on the outer surface of the inner race;

a plurality of rolling elements positioned between the outer race and the inner race with each of the rolling elements being located in a midpoint of one of the cammed surfaces, the rolling elements having a diameter less than the gap between the cylindrical inner surface and the midpoint of the cammed surfaces;

a retainer interconnecting all of the rolling elements and causing the rolling elements to circumferentially move in unison with one another, the retainer being rotatable about the first axis with limited relative rotation with respect to the inner race, the retainer including a plurality of retainer tabs extending axially toward an axial inner surface of the case end, a distal end of each of the retainer tabs being adjacent and spaced from the inner surface of the case end;

a first biasing element supported on the inner race to radially bias the retainer so as to hold each of the rolling elements onto the midpoints of the cammed surfaces;

an actuation disk having an outer diameter, an inner diameter and a thickness, disposed between the retainer and the inner surface of the case end, the actuation disk further including a plurality of notches located radially about one of the inner diameter and the outer diameter, the notches adapted to engage the retainer tabs thereby preventing rotational motion of the actuation disk relative to the retainer and allowing axial motion of the actuation disk relative to the retainer;

a second biasing element disposed between the actuation disk and the inner surface of the case end to bias the actuation disk away from the case end and toward the retainer; and an actuator to selectively overcome the second biasing element to force the actuation disk into contact with the case end, wherein engaging the over-running clutch includes energizing the actuator to force the actuation disk into contact with the case end such that rotation of the outer race and the case end with respect to the inner race is frictionally transferred to the actuation disk and the retainer, thereby moving the rolling elements along the ramp surfaces to a position where the rolling elements engage and wedge between the inner and outer races to prevent relative rotation between the inner and outer races, thereby locking both of the axle half-shafts together rotationally and transferring torque through the differential housing to both of the axles half-shafts evenly.

11. The method of claim 9 further comprising reading the rotational speed of a right rear wheel of the vehicle, the rotational speed of a left rear wheel of the vehicle, a throttle position, a steering angle, a brake signal, and the differential oil temperature, and calculating an average wheel speed, a wheel speed differential, an acceleration of each of the right and left rear wheels, an acceleration differential, and comparing the absolute value of the wheel speed differential to pre-determined wheel speed differential limits when the selector switch is in the automatic position.

12. The method of claim 11 further comprising leaving the over-running clutch disengaged when the absolute value of the wheel speed differential is more than a maximum wheel speed differential.

13. The method of claim 11 further comprising leaving the over-running clutch disengaged when the absolute value of the wheel speed differential is less than a maximum wheel speed differential and the brake signal is positive.

14. The method of claim 11 further comprising leaving the over-running clutch disengaged when the absolute value of the wheel speed differential is less than a maximum wheel speed differential, the brake signal is negative, and the differential oil temperature is less than a predetermined oil temperature.

15. The method of claim 11 further comprising engaging the over-running clutch when an absolute value of the wheel speed differential is less than a maximum wheel speed differential but more than a first predetermined wheel speed differential, the brake signal is negative, the differential oil temperature is more than a predetermined oil temperature, and the average wheel speed is less than a first predetermined average wheel speed.

16. The method of claim 11 further comprising engaging the over-running clutch when an absolute value of the wheel speed differential is less than a maximum wheel speed differential but more than a second predetermined wheel speed differential, the brake signal is negative, the differential oil temperature is more than a predetermined oil temperature, and the average wheel speed is less than a second predetermined average wheel speed.

17. The method of claim 11 further comprising engaging the over-running clutch when an absolute value of the wheel speed differential is less than a maximum wheel speed differential but more than a third predetermined wheel speed differential, the brake signal is negative, the differential oil temperature is more than a predetermined oil temperature, and the average wheel speed is less than a third predetermined average wheel speed.

18. The method of claim 11 further comprising engaging the over-running clutch when an absolute value of the wheel speed differential is less than a maximum wheel speed differential but more than a fourth predetermined wheel speed differential, the brake signal is negative, the differential oil temperature is more than a predetermined oil temperature, the average wheel speed is less than a maximum average wheel speed, and the throttle position is more than a first predetermined throttle position.

19. The method of claim 11 further comprising engaging the over-running clutch when an absolute value of the wheel speed differential is less than a maximum wheel speed differential and less than a fifth predetermined wheel speed differential, the brake signal is negative, the differential oil temperature is more than a predetermined oil temperature, the average wheel speed is less than a maximum average wheel speed, and the throttle position is more than a second predetermined throttle position.

20. The method of claim 11 further comprising engaging the over-running clutch when an absolute value of the wheel speed differential is less than a maximum wheel speed differential, the brake signal is negative, the differential oil temperature is more than a predetermined oil temperature, the average wheel speed is less than a first predetermined average wheel speed, the throttle position is more than a third predetermined throttle position, and the steering angle is less than a first predetermined steering angle.

21. The method of claim 11 further comprising engaging the over-running clutch when an absolute value of the wheel speed differential is less than a maximum wheel speed differential, the brake signal is negative, the differential oil temperature is more than a predetermined oil temperature, the average wheel speed is less than a second predetermined average wheel speed, the throttle position is more than a fourth predetermined throttle position, and the steering angle is less than a second predetermined steering angle.

22. The method of claim 11 further comprising engaging the over-running clutch when an absolute value of the wheel speed differential is less than a maximum wheel speed differential, the brake signal is negative, the differential oil temperature is more than a predetermined oil temperature, the average wheel speed is less than a third predetermined average wheel speed, the throttle position is more than a fifth predetermined throttle position, and the steering angle is less than a third predetermined steering angle.

23. The method of claim 11 further comprising engaging the over-running clutch when an absolute value of the wheel speed differential is less than a maximum wheel speed differential, the brake signal is negative, the differential oil temperature is more than a predetermined oil temperature, the average wheel speed is less than a fourth predetermined average wheel speed, the throttle position is more than a sixth predetermined throttle position, and the steering angle is less than a fourth predetermined steering angle.

24. The method of claim 11 further comprising engaging the over-running clutch when an absolute value of the wheel speed differential is less than a maximum wheel speed differential and less than a sixth predetermined wheel speed differential, the brake signal is negative, the differential oil temperature is more than a predetermined oil temperature, the average wheel speed is less than a fourth predetermined average wheel speed, and the throttle position is more than a seventh predetermined throttle position.

25. The method of claim 11 further comprising engaging the over-running clutch when an absolute value of the wheel speed differential is less than a maximum wheel speed differential, the brake signal is negative, the differential oil temperature is more than a predetermined oil temperature, the average wheel speed is less than a maximum average wheel speed, the throttle position is more than an eighth predetermined throttle position, and the steering angle is less than a fifth predetermined steering angle.

26. The method of claim 11 further comprising engaging the over-running clutch when an absolute value of the wheel speed differential is less than a maximum wheel speed differential and less than a seventh predetermined wheel speed differential, the brake signal is negative, the differential oil temperature is more than a predetermined oil temperature, the average wheel speed is less than a maximum average wheel speed, and the throttle position is more than a ninth predetermined throttle position.

27. The method of claim 11 further comprising engaging the over-running clutch when an absolute value of the wheel speed differential is less than a maximum wheel speed differential but more than an eighth predetermined wheel speed differential, the brake signal is negative, the differential oil temperature is more than a predetermined oil temperature, the average wheel speed is less than a third predetermined average wheel speed, and the steering angle is more than a sixth predetermined steering angle.

28. The method of claim 11 further comprising engaging the over-running clutch when an absolute value of the wheel speed differential is less than a maximum wheel speed differential and less than a ninth predetermined wheel speed differential, the brake signal is negative, the differential oil temperature is more than a predetermined oil temperature, the average wheel speed is less than a third predetermined average wheel speed, and the steering angle is less than a seventh predetermined steering angle.

29. The method of claim 11 further comprising engaging the over-running clutch when an absolute value of the wheel speed differential is less than a maximum wheel speed differential and more than a tenth predetermined wheel speed differential, the brake signal is negative, the differential oil temperature is more than a predetermined oil temperature, the average wheel speed is less than a maximum average wheel speed, the steering angle is more than an eighth predetermined steering angle, and the throttle position is more than value is more than a tenth predetermined throttle position.

30. The method of claim 11 further comprising engaging the over-running clutch when an absolute value of the wheel speed differential is less than a maximum wheel speed differential and less than an eleventh predetermined wheel speed differential, the brake signal is negative, the differential oil temperature is more than a predetermined oil temperature, the average wheel speed is less than a maximum average wheel speed, the steering angle is less than a ninth predetermined steering angle, and the throttle position is more than a tenth predetermined throttle position.

31. The method of claim 11 further comprising engaging the over-running clutch when an absolute value of the wheel speed differential is less than a maximum wheel speed differential, the brake signal is negative, the differential oil temperature is more than a predetermined oil temperature, the average wheel speed is less than a third predetermined average wheel speed, and the acceleration of one of the right rear wheel and the left rear wheel is more than a first predetermined acceleration.

32. The method of claim 11 further comprising engaging the over-running clutch when an absolute value of the wheel speed differential is less than a maximum wheel speed differential, the brake signal is negative, the differential oil temperature is more than a predetermined oil temperature, the average wheel speed is less than a fourth predetermined average wheel speed, the acceleration of one of the right rear wheel and the left rear wheel is more than a second predetermined acceleration, and the throttle value is more than an eleventh predetermined throttle position.

33. The method of claim 11 further comprising engaging the over-running clutch when an absolute value of the wheel speed differential is less than a maximum wheel speed differential, the brake signal is negative, the differential oil temperature is more than a predetermined oil temperature, the average wheel speed is less than a fourth predetermined average wheel speed, the acceleration of neither of the right rear wheel and the left rear wheel is more than a second predetermined acceleration, the difference between the acceleration of the right rear wheel and the left rear wheel is more than a first predetermined acceleration difference, and the throttle position is more than a twelfth predetermined throttle position.

34. The method of claim 11 further comprising engaging the over-running clutch when an absolute value of the wheel speed differential is less than a maximum wheel speed differential, the brake signal is negative, the differential oil temperature is more than a predetermined oil temperature, the average wheel speed is less than a maximum average wheel speed, the acceleration of one of the right rear wheel and the left rear wheel is more than a third predetermined acceleration, and the throttle value is more than an thirteenth predetermined throttle position.

35. The method of claim 11 further comprising engaging the over-running clutch when an absolute value of the wheel speed differential is less than a maximum wheel speed differential, the brake signal is negative, the differential oil temperature is more than a predetermined oil temperature, the average wheel speed is less than a maximum average wheel speed, the acceleration of neither of the right rear wheel and the left rear wheel is more than a third predetermined acceleration, the difference between the acceleration of the right rear wheel and the left rear wheel is more than a second predetermined acceleration difference, and the throttle position is more than a fourteenth predetermined throttle position.

* * * * *